United States Patent [19]
Gallant

[11] 3,862,793
[45] Jan. 28, 1975

[54] DEVICE FOR QUICK ALIGNMENT OF ANY AMONG GROUPED SPECIMEN AREAS ON A PLATE WITH OPTICAL MICROSCOPE AXIS

[75] Inventor: Reginald R. Gallant, Bristol, Conn.

[73] Assignee: Linbro Chemical Co., Inc., New Haven, Conn.

[22] Filed: Apr. 6, 1973

[21] Appl. No.: 348,470

[52] U.S. Cl. .................................. 350/90, 350/95
[51] Int. Cl. ........................................ G02b 21/26
[58] Field of Search .................. 350/90, 81, 94, 95

[56] References Cited
UNITED STATES PATENTS

| | | | |
|---|---|---|---|
| 536,552 | 3/1895 | Swift | 350/90 |
| 893,957 | 7/1908 | Watkins | 350/90 |
| 1,187,970 | 6/1916 | Cobb | 350/90 |
| 1,876,176 | 9/1932 | Sulzner | 350/86 |
| 1,996,141 | 4/1935 | Broadhurst et al. | 350/94 |
| 3,572,892 | 3/1971 | Metzgar et al. | 350/95 |
| 3,575,486 | 4/1971 | Posada | 350/90 |
| 3,600,057 | 8/1971 | Leffler | 350/81 |

OTHER PUBLICATIONS
Kniat, Western Electric Technical Digest No. 25, Jan. 1972, pages 51 and 52.

*Primary Examiner*—David H. Rubin
*Attorney, Agent, or Firm*—Walter Spruegel

[57] ABSTRACT

A first slide is guided in a first rectilinear path in a second slide which is guided on the stage of a microscope in a second rectilinear path at right angles to the first path, with the first slide removably receiving in located position thereon a plate with orderly grouped specimen areas any one of which is, by movement of the first slide in and with the second slide, alignable with the optical axis of the microscope. There are also provided fixed reference marks and a pointer on an extension of the first slide, of which the reference marks are so coordinated with the optical microscope axis and with the specimen areas of a located plate on the first slide that on alignment of the pointer with any particular reference mark a specimen area associated therewith is in alignment with the optical microscope axis.

5 Claims, 6 Drawing Figures

PATENTED JAN 28 1975    3,862,793
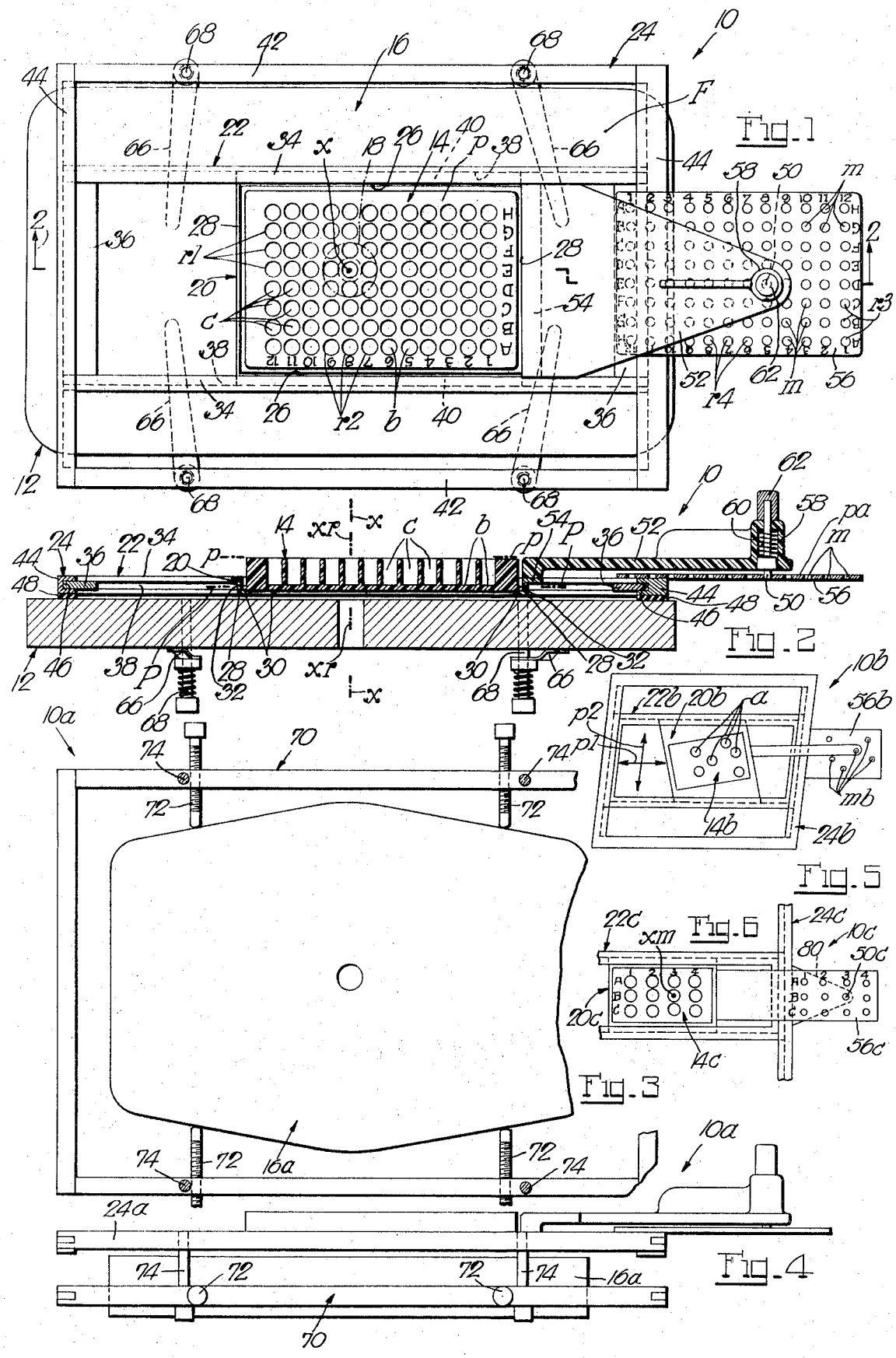

DEVICE FOR QUICK ALIGNMENT OF ANY AMONG GROUPED SPECIMEN AREAS ON A PLATE WITH OPTICAL MICROSCOPE AXIS

This invention relates to microscopic examination of specimen in general, and to a device for aligning any of a group of specimen with the optical axis of a microscope in particular.

The present invention is concerned with microscopic examination of subject matter especially, though not exclusively, in grouped cup formations in plates. Typical plates of this kind are customarily plastic-molded flat rectangular plates with transverse rows of cup formations open at the top of the plates, and with at least the bottom walls of the cup formations being of clear transparent plastic for microscopic examination of subject matter in these cup formations. In use of plates of this kind, the subject matter in at least one particular cup formation, and more often than not in more than one cup formation, in each individual plate requires microscopic examination, with these particular cup formations in different plates being for many examinations also different ones in the order of their grouping in these plates. For quick and ready identification of any particular cup formation in a plate, these plates are usually marked along a side margin and along an end margin of their top surfaces with different indicia, of which those along the side margin are in alignment with, and identify, the different lateral rows of cup formations in a plate, and those along the end margin are in alignment with, and identify, the different longitudinal rows of cup formations in a plate. To identify any particular cup formation in a plate of this kind having, for example, eight longitudinal rows of cup formations and twelve lateral rows of cup formations, of which each cup formation is at the intersection of a longitudinal and a lateral row, the plate may bear along one side margin of its top surface consecutive numbers from "1" to "12" in alignment with consecutive lateral rows of cup formations, respectively, in the plate, and may bear along one end margin of its top surface consecutive letters from "A" to "H" in alignment with consecutive longitudinal rows of cup formations, respectively, in the plate, whereby any particular cup formation is unmistakably identified by the letter and numeral of the respective longitudinal and lateral rows of cup formations of which the cup formation at the intersection of these rows is the particular cup formation thus identified.

It is the primary aim and object of the present invention to provide a device for quickly and accurately aligning any selected one of grouped specimen depositories on a plate, such as the cup formations in a plate of the kind referred to, with the optical axis of the lens system of a microscope without in any way resorting to the lens system for viewing the plate.

It is another object of the present invention to provide a device of this type which is arranged on the stage of a microscope and removably receives a plate in located position thereon, and the device is manipulatable to move the located plate into prescribed coordination with any of a plurality of fixed reference marks on the device outside the area or field of movability of a located plate thereon, with the reference marks being associated with the individual cup formations, respectively, in a located plate in the device, and through the latter with the microscope, so that on manipulation of the device for movement of a located plate thereon into prescribed coordination with any particular reference mark, the cup formation in the located plate which is associated with this reference mark is brought into accurate alignment with the optical axis of the lens system of the microscope, hereafter sometimes referred to as the "optical axis of the microscope".

It is a further object of the present invention to provide a device of this type which has a slide for removable placement of a plate in a predetermined located position thereon, and for the aforementioned movability of a located plate has provisions on the stage of a microscope for guiding the slide for independent movement, in either of two rectilinear paths at right angles to each other and in a plane parallel to the top of a located plate thereon and normal to the optical axis of the microscope, in a field within which any cup formation in the located plate may be brought into alignment with the optical microscope axis, and the aforementioned reference marks are fixed on the microscope stage outside the field of movability of the slide, with the slide having an extension with a pointer for alignment with any reference mark for the aforementioned prescribed coordination with the latter of a located plate on the slide. Thus, by moving the slide within its field of movability in its rectilinear paths for alignment of its pointer with any particular one of the reference marks, the cup formation in a located plate on the slide which is associated with the particular reference mark is brought into alignment with the optical axis of the microscope.

Another object of the present invention is to provide a device of this type in which the reference marks on the microscope stage are arranged in a layout pattern in a plane parallel to the aforementioned plane in which the slide is movable, with this layout pattern being the same identical layout pattern of the cup formations in a located plate on the slide in their spacing and relative location with respect to the rectilinear paths of movement of the slide, but for the aforementioned association of the reference marks with the cup formations in a located plate the layout pattern of the reference marks must in its plane be displaced 180° from that of the cup formations in a located plate owing to movability of the latter relative to the fixed reference marks for alignment of any cup formation in the located plate with the optical microscope axis.

A further object of the present invention is to provide a device of this type in which the provisions for guiding the aforementioned slide, i.e., the "first" slide, in either of two rectilinear paths at right angles to each other, are in the form of a second slide with a first rectilinear guideway for the first slide, and a second rectilinear guideway on the microscope stage on which the second slide is movable, with the first and second guideways being at right angles to each other.

It is another object of the present invention to provide a device of this type which is a unit separate from, and mountable on, the stage of a microscope, by providing, besides the aforementioned first and second slides, a frame which provides the aforementioned second guideway, and is mountable, preferably releasably, on the stage of a microscope, and the reference marks are provided on this frame.

It is a further object of the present invention to provide a device of this type as a unit separate from the stage of a microscope as aforementioned, in which the frame is in its mount on a microscope stage adjustable for coordination of the unit with the optical axis of the microscope in the installation of the unit on the microscope stage.

It is a further object of the present invention to provide a device of this type as a unit separate from the stage of a microscope as aforementioned in which the stage of a microscope stage adjustable frame is in its mount on a microscope stage adjustable for coordination of the unit with the optical axis of the microscope in the installation of the unit on the microscope stage.

Another object of the present invention is to provide a device of this type in which the reference marks are holes, and the pointer on the first slide is a pin, and preferably a plunger which is spring-urged into projection into any particular reference hole with which it is aligned, thereby releasably to lock the first and second slides against movement on the microscope stage in any position in which a cup formation in a located plate is in alignment with the optical axis of the microscope.

A further object of the present invention is to provide a device of this type for use especially with a plate of the aforementioned kind having longitudinal and lateral rows of cup formations aligned with and identified by different indicia along an end margin and along a side margin of the top surface of the plate, by providing the corresponding longitudinal and lateral rows of reference marks with aligned and identifying indicia which are identical with those on the plate, but the indicia along the end and side margins of the top surface of a located plate are necessarily in order reverse from that of their corresponding indicia at the reference marks due to movement of the plate relative to the fixed reference marks for alignment of any particular cup formation with the optical axis of the microscope by aligning the pointer on the first slide with the reference mark which is identified by the same two indicia that identify the particular cup formation in the plate.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a top view of a device embodying the invention;

FIG. 2 is a longitudinal section through the device taken on the line 2—2 of FIG. 1;

FIG. 3 is a top view of part of a device embodying the invention in a modified manner;

FIG. 4 is a side view of the modified device of FIG. 3 in mounted condition;

FIG. 5 is a diagrammatic view of a further modified device of the invention; and FIG. 6 is a diagrammatic view of still another modified device of the invention.

Referring to the drawings, and more particularly to FIGS. 1 and 2 thereof, the reference numeral 10 designates a device for viewing in a microscope 12 selected ones among specimen on orderly grouped areas of a plate 14. The device 10 is provided on the stage 16 of the microscope 12 which has a lens system 18 with an optical axis $x$.

The exemplary plate 14, which is a typical rectangular plate used in various laboratory procedures, such as micro titrations, for example, is molded of transparent plastic and provides longitudinal and lateral rows $r1$ and $r2$ of cup formations $c$ which are open at the top of the plate and have bottoms $b$. The cup formations $c$ are laid out in the top plane $p$ of the plate 14 in an exemplary pattern (FIG. 1) in which the rows $r1$ of cup formations $c$ are parallel and equally spaced, the rows $r2$ of cup formations are also parallel and equally spaced the same as the rows $r1$, and the rows $r1$ and $r2$ extend at right angles to each other, with each cup formation $c$ being also at the intersection of a longitudinal and a lateral row $r1$ and $r2$.

The device 10 provides in this instance a first slide 20 onto which a plate 14 is removably placeable in a certain located position, a second slide 22 on which the first slide 20 is guided for rectilinear movement, and a base 24 which is provided on top of the microscope stage 16 and on which the second slide 22 is guided for rectilinear movement transverse, and in this instance at right angles, to the guided movement of the first slide 20 on the second slide 22.

The first slide 20 is in this instance an open rectangular frame having opposite bars 26 and opposite end bars 28 of general L-section of which the lower legs 30 form a rectangular shelf on which a plate 14 rests, and the upright legs 32 form a receptacle in which the plate is received in fairly fitting fashion.

The second slide 22 is in this instance also an open rectangular frame having opposite side bars 34 and opposite end bars 36 of which the side bars 34 have opposed grooves 38 in which are slidably received outward ribs 40 on the side bars 26 of the first slide 20 for guidance of the latter in the second slide 22 for its aforementioned rectilinear movement therein.

The base 24 is in this instance also an open rectangular frame having opposite side bars 42 and opposite end bars 44, of which the end bars 44 are provided with opposed grooves 46 in which are slidably received outer margins of the end bars 36 of the second slide 22 for guidance of the latter in the base 24 for its aforementioned rectilinear movement therein at right angles to the guided movement of the first slide 20 in the second slide 22.

The base 24 is in this instance provided at its end bars 44 with bottom pads 48 which rest on top of the microscope stage 16 on which the device 10 is suitably mounted with its base 24.

With the device 10 serving to align anyone of the cup formations $c$ in a located plate 14 in the first slide 20 with the optical axis $x$ of the microscope for microscopic examination of subject matter in the particular cup formation, the arrangement is such that the first slide 20 is, by its movability in the second slide 22 and the movability of the latter in the base 24, movable in either of two rectangular paths in a "reference" plane P which extends normal to the optical axis of the microscope and also parallel to the top plane $p$ of a located plate 14 in the first slide 20. Further, the first slide 20 is thus movable in the plane P in a field F within which any cup formation in a located plate may be brought into alignment with the optical axis $x$ of the microscope, with this field F being defined by the extent of movability of the first slide 20 in the second slide 22 and the extent of movability of the latter in the base 24.

The device 10 further provides on the base 24 fixed reference marks $m$ for cooperation with a pointer 50 on the first slide 20, with these reference marks $m$ being so coordinated with the cup formations $c$ in a located plate 14 in the first slide 20 and with the optical microscope axis $x$, that on alignment of the pointer 50 with any one of the reference marks $m$ one of the cup formations in the located plate is in alignment with the optical axis $x$. To this end, the reference marks $m$ are laid out in a plane $pa$ parallel to the reference plane P in the same identical pattern in which the cup formations in a plate 14 are laid out, with the longitudinal and lateral rows $r3$ and $r4$ of reference marks $m$ being, furthermore, parallel to the longitudinal and lateral rows $r1$ and $r2$, respectively, of cup formations in a located plate 14 in the first slide 20, and the reference marks $m$ being arranged outside, and on one side of, the field F of movability of the first slide 20. For cooperation of the pointer 50 on the first slide 20 with the reference marks $m$, the pointer is carried by an extension 52 of the first slide 20, with the extension 52 being in this instance in the form of a plate which is suitably attached to an outward flange 54 on one of the end bars 28 of the slide 20, and is preferably transparent for ready view of the reference marks therebeneath. The reference marks $m$ are in this instance provided on a plate 56 which is suitably mounted, as by screws, for example, on one of the end bars 44 of the base 24, with the reference marks $m$ being preferably holes in the reference plate 56. In keeping with the preferred reference holes $m$, the pointer 50 is in the form of a pin or plunger in a socket formation 58 on the plate extension 52 on the first slide 20, with the plunger 50 being by a spring 60 urged into register with any reference hole $m$ with which it is in alignment, and the plunger 50 further carrying a knob 62 for retracting the plunger from register with any reference hole $m$.

Each of the reference holes $m$ is also associated with a particular cup formation $c$ in a located plate 14 in the first slide 20, so that on alignment of the plunger 50 with any particular reference hole $m$, by appropriate movement of the first slide 20 in the second slide 22 and with the latter in the base 24, the cup formation in the located plate 14 which is associated with the particular reference hole will be in accurate alignment with the optical microscope axis $x$. For quick and unmistakable indication to a technician using the device of the association of the individual cup formations in a located plate 14 in the first slide 20 with the respective reference holes $m$, the plates used in the device advantageously carry indicia which identify the individual cup formations therein, and the reference holes $m$ are marked with the same identifying indicia, so that on register of the plunger 50 with a reference hole $m$ of certain identifying indicia the cup formation with the same identifying indicia in a located plate in the first slide 20 will be in accurate alignment with the optical microscope axis. Thus, the exemplary plate 14 is along a side margin of its top surface provided with consecutive numerals from "1" to "12" which are in line with successive ones of the exemplary 12 lateral rows $r2$ of cup formations in the plate, and is further provided along an end margin of its top surface with consecutive letters from "A" to "H" which are in line with successive ones of the exemplary 8 longitudinal rows $r1$ of cup formations in the plate, wherefore any particular cup formation is unmistakably identified by the numeral and letter of the respective lateral and longitudinal rows $r2$ and $r1$ at the intersection of which the particular cup formation is located. In keeping with marking the cup formations in the exemplary plate 14 in this fashion, the reference plate 56 bears along a side margin thereof consecutive numerals from "1" to "12" which are in line with successive ones of twelve lateral rows $r4$ of reference holes $m$ that correspond to the exemplary number of twelve lateral rows $r2$ of cup formations in the plate 14, and the reference plate 56 further bears along an end margin thereof consecutive letters from "A" to "H" which are in line with successive ones of eight longitudinal rows $r3$ of reference holes $m$ that correspond to the exemplary number of eight longitudinal rows $r1$ of cup formations in the plate 14. For further correct association of the marked cup formations in a located plate 14 in the first slide 20 with the identically marked reference holes $m$ in the reference plate 56, the numerals and letters on the located plate and on the reference plate must appear to the viewer in reverse order owing to the fact that the located plate 14 is moved relative to the fixed reference holes $m$ for alignment of any particular cup formation with the optical microscope axis $x$ by aligning the plunger 50 with the reference hole $m$ which is associated with the particular cup formation. Thus, with the identifying numerals on the located plate 14 in FIG. 1 progressing to the left, the corresponding numerals on the reference plate 56 progress to the right along the upper side margin thereof, and with the identifying letters on the located plate 14 progressing upwardly, the corresponding letters on the reference plate 56 progress downwardly. In using these corresponding numerals and letters on the located plate 14 and on the reference plate 56, it will be noted in FIG. 1 that the cup formation E-8 in the located plate 14 is in alignment with the optical microscope axis $x$ when the plunger 50 is in register with the reference hole E-8 in the reference plate 56. It will also be noted in FIG. 1 that the identifying numerals and letters on the located plate 14 appear upside-down, and the corresponding numerals and letters on the reference plate appear rightside-up. However, since in this instance a plate 14 may also be placed in located position in the slide 20 with its identifying numerals and letters rightside-up, the reference plate 56 is preferably provided with a second set of corresponding identifying numerals and letters which in this instance appear upside-down. Accordingly, with this particular arrangement a technician may place a plate 14 in located position in the slide 20 with the identifying numerals and letters appearing either upside-down or rightside-up, and the technician has been taught that the corresponding numerals and letters on the reference plate 56 to be used for their association with the cup formations in the located plate 14 are the ones that appear in reverse of those on the located plate 14.

The device 10 is, in its initial mounting with its base 24 on the stage 16 of a microscope, so coordinated with the optical microscope axis that one of the cup formations in a located plate 14 in the slide 20 which is locked in position by register of the plunger 50 with the associated reference hole $m$, is in alignment with the optical axis $x$. In thus initially coordinating the device 10 with the optical axis $x$ of the microscope, any other cup formation in a located plate 14 will quickly and unmistakably be brought into accurate alignment with the optical axis by mere movement of the slide with sole attention to bringing the plunger 50 into alignment and register with the associated reference hole $m$ in the reference plate 56.

While the base 24 of the device 10 could obviously be formed integrally with the stage of a microscope and thereby make the device an inseparable part of the microscope, it is preferred to make the device a unit separate and apart from a microscope and having suitable provisions for its mount on a microscope stage. Thus, the exemplary device 10 is mounted with its base frame 24 on the stage 10 of a microscope. In this instance, the device 10 is adjustably mounted with its base frame 24 on the microscope stage 16 by fingers 66 which are slidable on depending posts 68 on the side bars 42 of the base frame 24 and spring-urged against the bottom of the microscope stage 16, with the base frame 24 being wider than the microscope stage 16 for projection of the posts 68 past the latter. In thus mounting the device 10 on the microscope stage 16, the plunger 50 is preferably in register with any one of the reference holes $m$, such as the reference hole E-8 as shown in FIG. 1 to establish in the device a reference axis $xr$ which is brought into coincidence with the optical microscope axis $x$ when mounting the device.

Reference is next had to FIGS. 3 and 4 which show a modified device 10a that is in all respects like the described device 10, except that it lacks the spring-urged mounting fingers 66 of the latter and, instead, has ad additional frame 70 with set screws 72 for mounting the device on a microscope stage 16a. The frame 70 is quite similar to the base frame 24a of the device, and carries upright posts 74 on which the base frame 24a is mounted, with the frame 70, and with it the remainder of the device 10a, being by the set screws 72 clamped to the opposite sides of the microscope stage 16a in properly adjusted position.

Reference is finally had to FIG. 5 which diagrammatically shows still another modified device 10b that also demonstrates with particular clarity a principle of the device that also holds true for the device of FIG. 1. Thus, the first slide 20b is, by its movability in the second slide 22b and by movement with the latter in the base frame 24b, guided for movement in either of two paths $p1$ and $p2$ which are transverse to each other, but in this instance other than at right angles to each other. Further, the plate 14b, which is received in a certain located position in the first slide 20b, has specimen areas $a$ which are arranged in a random layout pattern in a plane which is parallel to that of the reference plate 56b in which the reference marks $mb$ are laid out, with the layout pattern of the reference marks being identical with that of the specimen areas $a$ on the plate 14b, except that the layout pattern of the reference marks is in its plane displaced or turned around 1808° from that of the specimen areas on located plate 14b for reasons now readily understood.

While in the devices, 10, 10a and 10b of FIGS. 1, 4 and 5 the reference plate with the reference holes is fixed and the pointer or plunger is movable with the first slide that carries a plate with specimen areas or cup formations, it is, of course, fully within the purview of the invention to have the reference plate move with the first slide, and have the pointer or plunger stationary. Thus, FIG. 6 shows diagrammatically a device 10c in which the reference plate 56c is carried by, and hence movable with, the first slide 20c, and the pointer or plunger 50c is carried by an extension 80 on the base frame 24c, with this extension 80 being underneath the reference plate 56c, and the latter being in this instance transparent for ready view and manipulation of the plunger 50c. Thus, the plunger 50c is shown in register with the reference hole B-3, wherefore the cup formation B-3 in the located plate 14c in the first slide 20c is in alignment with the optical microscope axis $xm$. By appropriately moving the first slide 20c in and with the second slide 22c, any other particular cup formation in the located plate 14c in the first slide 20 $c$ will be aligned with the optical microscope axis $xm$ on aligning the reference hole of the same letter and numeral identification as the particular cup formation with the plunger 50c, as will be readily understood.

What is claimed is:

1. A self-contained microscope location finder for use with a rectangular plate having in its top surface a plurality of cup formations arranged in a given pattern of spaced parallel longitudinal and transverse rows, with each cup formation being at the intersection of a longitudinal and a transverse row, said finder comprising a base; a slide with an extension member; means on said base for supporting and guiding said slide for movement in a given field in either of two transverse paths in a first plane; means on said slide for removable placement thereon of a plate in a certain located position in which the top surface thereof is parallel to said first plane, with any cup formation in a located plate on said slide being alignable with a fixed reference axis normal to said first plane by movement of said slide within said field; a member on said base outside, and on one side of, said field; reference marks on one of said members and being in number equal to that of the cup formations in a plate, with said reference marks being in a plane parallel to said first plane and arranged in spaced parallel longitudinal and transverse rows of the same pattern as the cup formations in a plate, and the longitudinal and transverse rows of reference marks being parallel to the longitudinal and transverse rows, respectively, of cup formations in a located plate on said slide; a pointer on the other of said members so coordinated with said reference marks that on alignment of said pointer with any reference mark a corresponding cup formation in a locaed plate on said slide is in alignment with said reference axis; and means of said base for mounting the latter on the stage of a microscope for adjustability thereon to bring said reference axis into coincidence with the optical microscope axis.

2. A location finder as in claim 1, in which said base has a bottom surface, and said mounting means include said bottom surface which is adapted to rest on top of the stage of a microscope, and further provide clips carried by said base underneath said bottom surface and spring-urged toward the latter for engagement with the bottom of the stage of a microscope.

3. A location finder as in claim 1, in which said mounting means provide a hollow frame formation on said base adapted to embrace the sides of a microscope stage with clearance, and set screws in said frame formation for engagement with the sides of a microscope stage.

4. A location finder as in claim 1, in which said base is a first open rectangular frame having spaced parallel side bars and spaced parallel end bars, said slide guiding means provide first longitudinal guide grooves in said end bars facing each other and lying in a plane parallel to said first plane, a second open rectangular frame having second spaced parallel end bars and second parallel side bars parallel to and spaced closer than those of said first frame and provided with second longitudinal guide grooves facing each other and lying in a plane parallel to said first plane, with said second frame being with its end bars guided for movement in said first grooves, and said slide being guided for movement in said second grooves, and one of said end bars of said first frame has an extension forming said member on said base and provided with said reference marks.

5. A location finder as in claim 4, in which said slide is a third open rectangular frame having third spaced parallel end bars and third spaced parallel side bars, with said third bars having inward ledges and forming with the latter a receptacle for removable placement therein of a plate in said certain located position, and said slide extension member is transparent and outside the confines of said receptacle.

* * * * *